US008114803B2

(12) United States Patent
Yuasa et al.

(10) Patent No.: US 8,114,803 B2
(45) Date of Patent: Feb. 14, 2012

(54) CATALYST MATERIAL AND PROCESS FOR PREPARING THE SAME

(75) Inventors: Makoto Yuasa, Soka (JP); Kenichi Oyaizu, Mitaka (JP); Aritomo Yamaguchi, Yokohama (JP); Hiroshi Ikkanda, Tokyo (JP); Ken Tanaka, Saitama (JP); Yuichi Iai, Tokyo (JP); Masakuni Yamamoto, Utsunomiya (JP); Shigeru Kido, Ishikawa-gun (JP); Hidetaka Nishikoori, Susono (JP); Tetsuo Nagami, Nagoya (JP); Naoko Iwata, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 500 days.

(21) Appl. No.: 11/883,479

(22) PCT Filed: Feb. 3, 2006

(86) PCT No.: PCT/JP2006/002299
§ 371 (c)(1),
(2), (4) Date: Mar. 28, 2008

(87) PCT Pub. No.: WO2006/083029
PCT Pub. Date: Aug. 10, 2006

(65) Prior Publication Data
US 2008/0233466 A1 Sep. 25, 2008

(30) Foreign Application Priority Data
Feb. 3, 2005 (JP) .................................. 2005-028141

(51) Int. Cl.
*B01J 21/00* (2006.01)
*B01J 23/00* (2006.01)
*B01J 25/00* (2006.01)
*B01J 29/00* (2006.01)
*B01J 31/00* (2006.01)
*B01J 37/00* (2006.01)
*B01J 27/24* (2006.01)
*B01J 21/04* (2006.01)
*B01J 23/02* (2006.01)
*C08F 4/02* (2006.01)
*C08F 4/60* (2006.01)

(52) U.S. Cl. ........ 502/150; 502/100; 502/102; 502/200; 502/439

(58) Field of Classification Search .................. 502/100, 502/102, 150, 200, 439
See application file for complete search history.

(56) References Cited

U.S. PATENT DOCUMENTS
5,729,427 A * 3/1998 Li et al. .......................... 361/503
(Continued)

FOREIGN PATENT DOCUMENTS
JP    A 7-273431    10/1995
(Continued)

OTHER PUBLICATIONS
Wu et al, "Polyaniline-carbon composite films as supports of Pt and PtRu particles for methanol electrooxidation", *Carbon*, Elsevier, Oxford, Great Britain, vol. 43, No. 12, Oct. 1, 2005, pp. 2579-2587.
(Continued)

Primary Examiner — James McDonough
(74) Attorney, Agent, or Firm — Oliff & Berridge, PLC

(57) ABSTRACT

This invention provides a catalyst material comprising a conductive material coated with a polynuclear complex molecule derived from at least two types of heteromonocyclic compounds and a catalyst metal coordinated to the coating layer of the polynuclear complex molecule, and a catalyst material comprising a conductive material coated with a polynuclear complex molecule derived from a heteromonocyclic compound and a catalyst metal, which is a composite of a noble metal and a transition metal, coordinated to the coating layer of the polynuclear complex molecule. Such catalyst material of the invention has excellent catalytic performance and serviceability as, for example, an electrode of fuel cells.

33 Claims, 5 Drawing Sheets

U.S. PATENT DOCUMENTS

2002/0025477 A1\* 2/2002 Itagaki et al. ............... 429/328
2005/0019650 A1\* 1/2005 Asaoka ........................ 429/42

FOREIGN PATENT DOCUMENTS

| JP | A 10-249208 | 9/1998 |
| JP | A 11-253811 | 9/1999 |
| JP | A 11-276900 | 10/1999 |
| JP | A 2002-329500 | 11/2002 |
| JP | A 2003-109614 | 4/2003 |
| JP | A 2004-296425 | 10/2004 |
| JP | A 2004-331586 | 11/2004 |
| JP | A 2005-66592 | 3/2005 |
| WO | WO 01/015253 A1 | 3/2001 |

OTHER PUBLICATIONS

Koji Ikkanda, "Preparation of polypyrrole/metal complexes as the catalyst for electroreduction of oxygen," The 84th Spring Meeting of the Chemical Society of Japan, pp. 416, Mar. 11, 2004. (w/ partial translation).

H. Itsuki, "Synthesis of cobalt complexes coordinated to polypyrrole titalytic activity for oxygen reduction," The 71st Meeting of the Electrochemical Society of Japan, pp. 373, Mar. 17, 2004. (w/ partial translation).

Xiaoping Mo et al., "The application off polypyrrole fibrils in hydrogen evolution reaction," Synthetic Meatls, vol. 142, pp. 217-221, 2004.

Fethi Bodioui et al., "Metalloporphyrin-Polypyrrole Film Electrode: Charaterization and Catalytic Application," Journal of Electroanalytical Chemistry, vol. 207, pp. 87-99, 1986.

Rong-Zhong et al., "Catalysis of dioxygen reduction at soluble polyaniline modified electrode," Chinese Journal of Chemistry, vol. 9, No. 2, pp. 116-125, 1991.

Ken Tanaka, "Effect of various metal species on four-electron oxygen reduction using metal-polypyrrole complexes supported on carbon particles," The 72nd Meeting of the Electrochemical Society of Japan, pp. 229, Apr. 1, 2005.

M. Yuasa et al., "A Comparision of Several Meso-Tetraalkyl Cobalt Porphyrins as Catalysts for the Electroreduction of Dioxygen," Polymers for Advanced Technologies, vol. 12, pp. 266-270, 2001.

Makoto Yuasa, "Surface Modification of Macrocyclic Compounds on Electrodes as Electrode Catalysts," Hyomen Gijyutsu (The Journal of the Surface Finishing Society of Japan), vol. 46, No. 4, pp. 303-311, 1995. (w/ partial translation).

\* cited by examiner

CATALYST MATERIAL AND PROCESS FOR PREPARING THE SAME

TECHNICAL FIELD

The present invention relates to a catalyst material. More particularly, the present invention relates to a catalyst material having high catalytic activity and being suitable as a catalyst for fuel cells and a process for preparing the same.

BACKGROUND ART

Recently, many investigations have been made of electrode systems, as electrode catalysts, which have undergone surface modification with a macrocyclic compound, such as porphyrin, chlorophyll, phthalocyanine, tetraazaannulene or Schiff base, or a derivative thereof. And these electrode systems are expected to be applied, as electrode catalysts which take the place of platinum (Pt) and its alloys, to the cathode of (oxygen-hydrogen) fuel cells, such as phosphoric acid fuel cells or polymer electrolyte fuel cells, by utilizing the electrochemical multielectron reduction properties of molecular oxygen ($O_2$) (see Hyomen Gijyutsu (The Journal of the Surface Finishing Society of Japan)", vol. 46, No. 4, pp. 19-26 and "POLYMERS FOR ADVANCED TECHNOLOGYS", No. 12, pp. 266-270, 2001).

However, the catalytic activity of the electrode systems utilizing any of the above macrocyclic compounds is insufficient to use the systems in fuel cells. Under these circumstances, there have been demands for development of catalyst materials having higher catalytic performance and serviceability.

DISCLOSURE OF THE INVENTION

It is therefore an object of the present invention to provide a catalyst material that has excellent catalytic performance and serviceability as, for example, an electrode of fuel cells.

To solve the above problem, first, the present inventors examined the reasons why the electrode catalysts utilizing a macrocyclic compound do not have sufficiently high catalytic activity. And they inferred from the examination that in macrocyclic compounds, the density of an active species is lowered when it is supported on a catalyst support, whereby the activity of the catalyst electrode utilizing a macrocyclic compound is decreased. The present inventors have found through the examination that if a catalyst support is coated with a heteromonocyclic compound or a polynuclear complex molecule derived from the heteromonocyclic compound, a lot of $M-N_4$ structure where a catalyst metal is coordinated is formed, whereby a catalyst material having high catalytic activity is obtained.

Thus, the present inventors have invented a catalyst material, prepared by coordinating a catalyst metal to the coordination sites of a conductive material coated with a polynuclear complex molecule, the coordination sites being formed by the polynuclear complex molecule, characterized in that the polynuclear complex molecule is derived from a heteromonocyclic compound.

After dedicating their efforts to the investigation, the present inventors have found that when the polynuclear complex molecule is derived from at least two types of heteromonocyclic compounds, the resultant catalyst material has significantly improved catalytic activity, and they have reached the present invention. Further, they have found that when a catalyst metal coordinated to the coating layer is a composite of a noble metal and a transition metal, the resultant catalyst material has significantly improved catalytic activity, and they have reached the present invention.

First, the present invention provides a catalyst material comprising a conductive material coated with a polynuclear complex molecule derived from at least two types of heteromonocyclic compounds and a catalyst metal coordinated to the coating layer of the polynuclear complex molecule. Preferably, the catalyst metal is a composite of a noble metal and a transition metal.

Also, the present invention provides a catalyst material comprising a conductive material coated with a polynuclear complex molecule derived from a heteromonocyclic compound and a catalyst metal, which is a composite of a noble metal and a transition metal, coordinated to the coating layer of the polynuclear complex molecule.

In the catalyst material comprising a catalyst metal coordinated to the coating layer of the polynuclear complex molecule of a conductive material coated with a polynuclear complex molecule derived from a heteromonocyclic compound, (1) when the polynuclear complex molecule is derived from at least two types of heteromonocyclic compounds or (2) when a catalyst metal to be coordinated to the coating layer is a composite of a noble metal and a transition metal, catalytic activity is significantly improved, and an effect of restraining the production of hydrogen peroxide is improved.

In the present invention, preferable examples of the heteromonocyclic compound include monocyclic compounds each having pyrrole, dimethylpyrrole, pyrrole-2-carboxyaldehyde, pyrrole-2-alcohol, vinylpyridine, aminobenzoic acid, aniline, or thiophene as a basic skeleton.

Preferable examples of the polynuclear complex molecule include a polypyrrole complex, a polyvinylpyridine complex, a polyaniline complex, and a polythiophene complex.

In the present invention, the polynuclear complex molecule derived from the heteromonocyclic compound is preferably obtained by subjecting the heteromonocyclic compound to electrochemical polymerization.

In the present invention, when a catalyst metal is a composite of a noble metal and a transition metal, preferable examples of the noble metal include one or more members selected from the group consisting of palladium (Pd), iridium (Ir), rhodium (Rh), and platinum (Pt); and those of the transition metal include one or more members selected from the group consisting of cobalt (Co), iron (Fe), molybdenum (Mo), and chromium (Cr). Of these, when a noble metal is iridium (Ir) and a transition metal is cobalt (Co), when a noble metal is rhodium (Rh) and a transition metal is cobalt (Co), and when a noble metal is palladium (Pd) and a transition metal is cobalt (Co), a catalyst material with particularly high activity can be obtained.

In the present invention, the term "ancillary ligand" means a low-molecular-weight compound that has the function of more completely achieving the coordination of a catalyst metal by assisting in coordinating "the polynuclear complex molecules derived from at least two types of heteromonocyclic compounds" to the catalyst metal. Preferable examples of such ancillary ligands include low-molecular-weight heterocyclic compounds. Use of an ancillary ligand makes it possible to improve the catalytic activity of a catalyst material. For example, it is preferable from the viewpoint of promoting the coordination of a catalyst metal to coordinate, as an ancillary ligand, a nitrogen-containing low-molecular-weight compound, which is a low-molecular-weight heterocyclic compound, to the catalyst metal. As the nitrogen-containing low-molecular-weight compound, any one of various kinds of compounds is used. Preferable examples of such compounds include pyridine and phenanthroline.

The content of the noble metal(s) in the catalyst material comprising composite catalyst metals is preferably 20 to 60 wt %. If the content of the noble metal(s) is in such a range, the improvement in catalytic activity can be observed.

Further, the catalyst material comprising composite catalyst metals is preferably heat-treated. The catalytic activity of the resultant catalyst material can be significantly improved by heat treatment. The specific conditions under which heat treatment is carried out vary depending on the catalyst components and the heating temperature; however, heat treatment is preferably carried out, for example, at 400° C. to 700° C. for 2 to 4 hours.

In the present invention, preferably, the raw material for the catalyst material that contains composite catalyst metals as described above is highly purified. If the raw material for the catalyst material is highly purified, the catalytic activity is significantly improved. A specific example of a method for highly purifying the raw material for the catalyst material is that palladium acetate is used as a palladium raw material and the purity of the palladium acetate is increased by a known physical or chemical method. Although the reasons that the catalytic activity is significantly improved by the purification of the raw material for the catalyst material have not been fully clarified yet, the improvement may be attributed to the improvement in the surface composition of N, Co, Pd, etc., which form the active sites, particularly to the significant increase in the amount of Pd introduced.

In the present invention, preferable examples of conductive materials as described above include metals, semiconductors, carbon-based compounds and conductive polymers.

Preferably, the catalyst material of the present invention includes a second metal and/or its ion as well as the above catalyst metal. It is also preferable from the viewpoint of improving the activity to dope the catalyst material with anion.

The shape of the catalyst material of the present invention is not limited to any specific one. For example, it can be a particle-like, fiber-like, hollow, or corned horn-like material.

Second, the present invention provides a method for preparing such catalyst material. More specifically, the method comprises the following steps (1) to (4).

(1) A step of coating a conductive material surface with a polynuclear complex molecule derived from at least two types of heteromonocyclic compounds and a step of coordinating a catalyst metal to the coating layer of the polynuclear complex molecule.

(2) A step of coordinating a catalyst metal to at least two types of heteromonocyclic compounds and a step of coating a conductive material surface with a polynuclear complex molecule derived from at least two types of heteromonocyclic compounds.

In steps (1) and (2), the catalyst metal can be a composite of a noble metal and a transition metal.

(3) A step of coating a conductive material surface with a polynuclear complex molecule derived from a heteromonocyclic compound and a step of coordinating a catalyst metal, which is a composite of a noble metal and a transition metal, to the coating layer of the polynuclear complex molecule.

(4) A step of coordinating a catalyst metal, which is a composite of a noble metal and a transition metal, to a heteromonocyclic compound and a step of coating a conductive material surface with a polynuclear complex molecule derived from a heteromonocyclic compound.

In the present invention, the step of coating the conductive material surface with a polynuclear complex molecule derived from a heteromonocyclic compound comprises electrochemical polymerization of a heteromonocyclic compound having, as a basic skeleton, pyrrole, vinylpyridine, aniline, or thiophene on the conductive material. The subsequent step of coordinating a catalyst metal to the coating layer of the polynuclear complex molecule comprises allowing a catalyst metal or a salt t hereof to react with the coating layer of the polynuclear complex molecule.

Alternatively, these two steps can be performed in the opposite manner. The step of coordinating a catalyst metal to the heteromonocyclic compound can involve coordinating a catalyst metal to a heteromonocyclic compound having, as a basic skeleton, pyrrole, vinylpyridine, aniline, or thiophene. The subsequent step of coating the conductive material surface with a polynuclear complex molecule derived from a heteromonocyclic compound can involve electrochemical polymerization of the coordination compound on the conductive material.

In the present invention, a step of heat treatment is preferably carried out following the step of coordinating a catalyst metal. Such heat treatment can improve catalytic activity. Heat treatment can significantly improve catalytic activity. The specific conditions under which heat treatment is carried out vary depending on the catalyst components and the heating temperature; however, heat treatment is preferably carried out, for example, at 400° C. to 700° C. for 2 to 4 hours.

In the present invention, preferable examples of the heteromonocyclic compounds include monocyclic compounds each having, as a basic skeleton, pyrrole, dimethylpyrrole, pyrrole-2-carboxyaldehyde, pyrrole-2-alcohol, vinylpyridine, aminobenzoic acid, aniline, or thiophene.

Preferable examples of the polynuclear complex molecule include a polypyrrole complex, a polyvinylpyridine complex, a polyaniline complex, and a polythiophene complex.

In the present invention, the step of obtaining a polynuclear complex molecule from a heteromonocyclic compound is preferably carried out by subjecting the heteromonocyclic compound to electrochemical polymerization. Techniques of subjecting the heteromonocyclic compound to electrochemical polymerization are disclosed by various known documents.

In the present invention, preferable examples of noble metals include at least one member selected from among palladium (Pd), iridium (Ir), rhodium (Rh), and platinum (Pt), and preferable examples of transition metals include at least one member selected from among cobalt (Co), iron (Fe), molybdenum (Mo), and chromium (Cr). Of these combinations, particularly preferable are the combination of iridium (Ir), as a noble metal, and cobalt (Co), as a transition metal, the combination of rhodium (Rh), as a noble metal, and cobalt (Co), as a transition metal, and the combination of palladium (Pd), as a noble metal, and cobalt (Co), as a transition metal.

In the present invention, it is preferable from the viewpoint of promoting the coordination of a catalyst metal to coordinate a low-molecular-weight heterocyclic compound to the catalyst metal. As the low-molecular-weight heterocyclic compound, any one of various kinds of compounds is used. Of these compounds, preferable are pyridine, which has one nitrogen atom as a hetero atom, and phenanthroline, which has two nitrogen atoms as hetero atoms.

The content of the noble metal(s) in the catalyst material comprising composite catalyst metals is preferably 20 to 60 wt %. If the content of the noble metal(s) is in such a range, the improvement in catalytic activity can be observed.

Preferably, the raw material for the catalyst material that contains composite catalyst metals as described above is highly purified. If the raw material for the catalyst material is highly purified, the catalytic activity is significantly improved.

In the present invention, preferable examples of conductive materials as described above include metals, semiconductors, carbon-based compounds and conductive polymers.

Preferably, the catalyst material of the present invention includes a second metal and/or its ion as well as the above catalyst metal. It is also preferable from the viewpoint of improving the activity to dope the catalyst material with anion.

Thirdly, the present invention provides a fuel cell which includes the above catalyst material as a catalyst for fuel cells.

The catalyst material of the present invention comprises a catalyst metal supported on a polynuclear complex molecule. The catalyst material has excellent catalytic activity, and when used as a catalyst for fuel cells, it can improve the effect of restraining the production of hydrogen peroxide of fuel cells.

Accordingly, the present invention can provide an economically efficient catalyst material without the use of an expensive noble metal such as platinum.

PREFERRED EMBODIMENTS OF THE INVENTION

Figure 1:
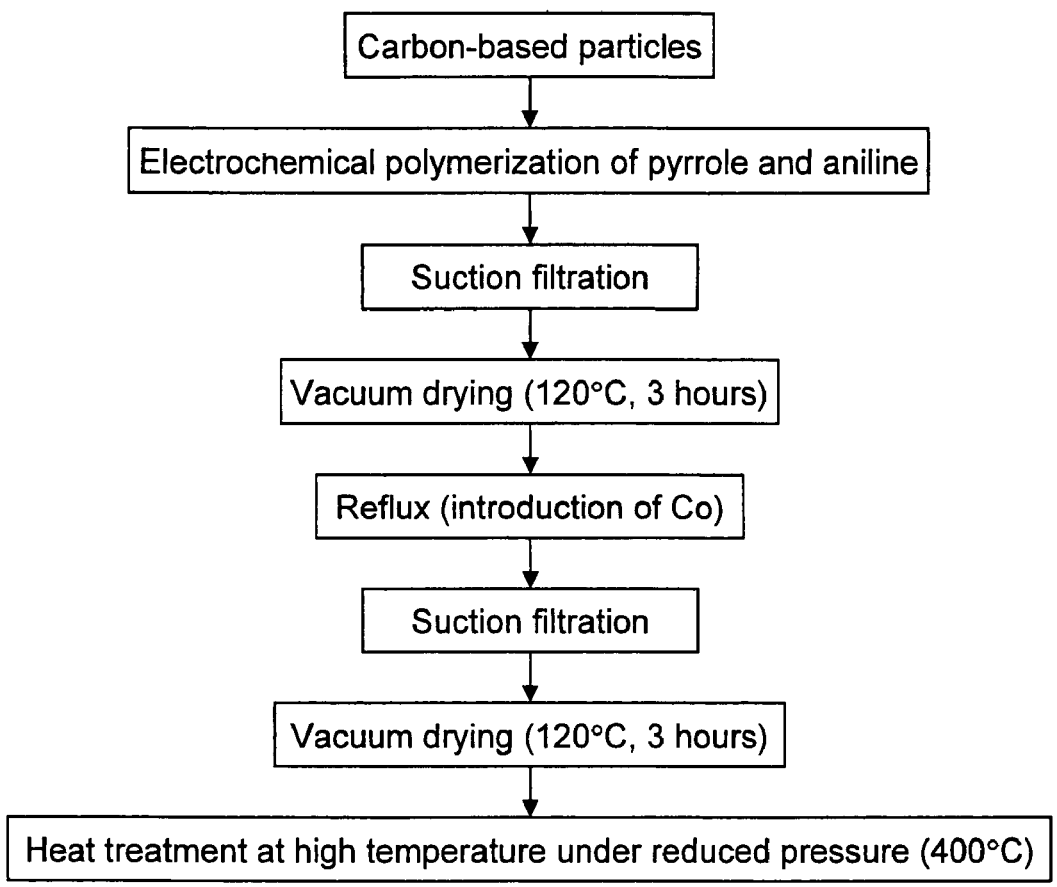
FIG. 1 is a flow diagram of the preparation involving simultaneous electrochemical polymerization of pyrrole and aniline and introduction of cobalt (Co-PPy+PAn-C).

The catalyst material of the present invention is prepared by coating the surface of a conductive material with a polynuclear complex molecule derived from a heteromonocyclic compound and coordinating catalyst metal(s) to the coordination site(s) thereof.

Examples of the conductive material usable for the catalyst material include: metals such as platinum, gold, silver, and stainless steel; semiconductors such as silicon; carbon-based materials such as glassy carbon, carbon black, graphite, and activated carbon; and conductive polymers such as polyaniline, polypyrrole, and polythiophene. From the view point of availability, cost, weight, etc., preferably, a carbon-based material such as glassy carbon, carbon black, graphite, or activated carbon is used as the conductive material. From the point of ensuring a large surface area, the conductive material is preferably a particle-like, fiber-like, hollow, or corned horn-like material, though it can be a sheet-like or rod-like material.

Of particle-like conductive materials, materials having a particle size of 0.01 to 10 μm are particularly preferable. As a fiber-like, hollow, or corned horn-like conductive material, carbon fiber (filler), carbon nanotube, or carbon nanohorn is preferable, respectively.

The polynuclear complex molecule that coats the conductive material is derived from a heteromonocyclic compound. Examples of heteromonocyclic compounds usable as a raw material include: monocyclic compounds each having, as a basic skeleton, pyrrole, vinylpyridine, aniline, or thiophene. Particularly, pyrrole, dimethylpyrrole, pyrrole-2-carboxyaldehyde, pyrrole-2-alcohol, vinylpyridine, aniline, aminobenzoic acid, or thiophene is used as a heteromonocyclic compound.

Examples of catalyst metals which can be coordinated to the coordination sites of the polynuclear complex molecule include: one or more noble metals selected from the group consisting of palladium (Pd), iridium (Ir), rhodium (Rh), platinum (Pt), and the like; and one or more transition metals selected from the group consisting of cobalt (Co), iron (Fe), molybdenum (Mo), chromium (Cr), iridium (Ir), and the like which are made into composites with the noble metal(s).

As a process for deriving a polynuclear complex molecule from any one of the above heteromonocyclic compounds and coating the conductive material with the polynuclear complex molecule, various processes can be used. For example, a heteromonocyclic compound is first coordinated to a catalyst metal to prepare a coordination compound, and the resulting coordination compound is heat-treated at an adequate temperature to coat the conductive material with the coordination compound. Alternatively, the conductive material can be coated with the coordination compound by a mechanochemical process. Coating via electrochemical polymerization is preferable from the viewpoint of easiness.

Examples of electrochemical polymerization include the following. The first electrochemical polymerization process is a process in which a heteromonocyclic compound is electrochemically polymerized on a conductive material to produce a polynuclear complex molecule so that the conductive material is coated with the polynuclear complex molecule and then a catalyst metal is allowed to act on the polynuclear complex molecule so that the coordination sites of the polynuclear complex molecule (when the polynuclear complex molecule is a nitrogen-containing complex compound, the $M-N_4$ structure sites) support the catalyst metal.

When the conductive material is a commonly used sheet-like or rod-like material, the electrochemical polymerization of a heteromonocyclic compound on the conductive material can be carried out using conventional electrochemical polymerization apparatus under conventional conditions. However, when the conductive material used is a fine particle-like, fiber-like, hollow, or corned horn-like material, it is effective to use fluidized bed electrode electrochemical polymerization apparatus.

To allow a solution containing a catalyst metal to act on the conductive particles coated with the polynuclear complex obtained by electrochemical polymerization (hereinafter referred to as "coated particles"), for example, the coated particles are suspended in a proper solution in which the catalyst metal is dissolved and the suspension is refluxed with heat under an inert gas atmosphere.

An example of the other technique of electrochemical polymerization is a method wherein a coordination compound prepared by coordinating a heteromonocyclic compound to a catalyst metal (hereafter merely referred to as a "coordination compound") is subjected to electrochemical polymerization on a conductive material, and the conductive material is coated with a polynuclear complex molecule to support the catalyst metal thereon.

The coordination compound used in this technique can be obtained by, for example, subjecting a catalyst metal salt and a heteromonocyclic compound to reflux in an adequate solvent, preferably under inert gas atmosphere, and evaporating the solvent, followed by vacuum drying.

The amount of the heteromonocyclic compound used in the preparation of the coordination compound is preferably about 1 to 10 moles relative to 1 mole of the catalyst metal salt.

Examples of a coordination compound in which a catalyst metal is coordinated to at least two types of heteromonocyclic compounds include: a cobalt-pyrrole 1:4 coordination compound expressed by the following chemical formula (I-1);

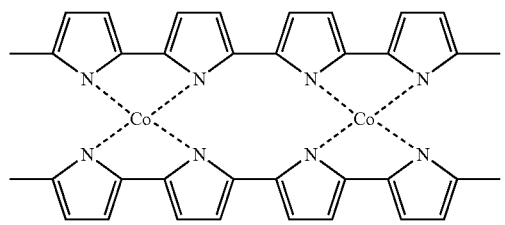
(I-1)

and a cobalt-aniline 1:4 coordination compound expressed by the following chemical formula (I-2).

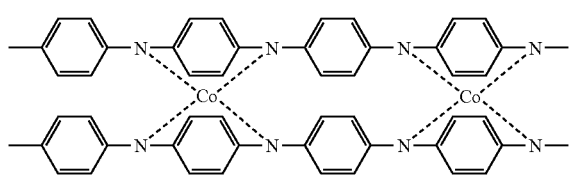
(I-2)

Although the coordination states are not exactly apparent, the coordination compound of chemical formula (I-1) and that of chemical formula (I-2) or the coordination compound in which the compound of chemical formula (I-1) and that of chemical formula (I-2) are partially made composite may also be included.

In the present invention, an example of a coordination compound comprising a catalyst material, which is a composite of a noble metal and a transition metal, coordinated thereto is a composite of a cobalt-pyrrole 1:4 coordination compound expressed by the following chemical formula (II-1);

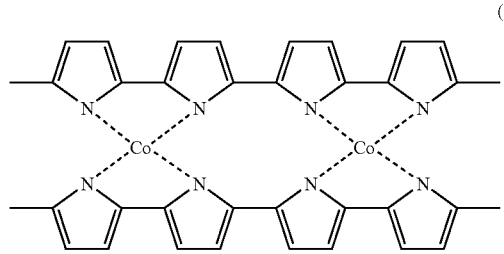
(II-1)

and an iridium-pyrrole 1:4 coordination compound expressed by the following chemical formula (II-2).

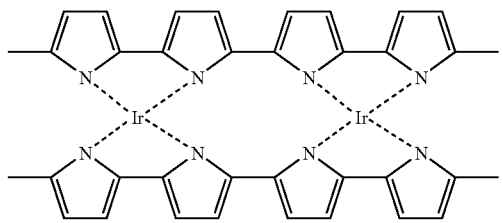
(II-2)

Another example of a coordination compound comprising a catalyst material, which is a composite of a noble metal and a transition metal, coordinated thereto is a composite of a cobalt-pyrrole 1:4 coordination compound expressed by the following chemical formula (III-1);

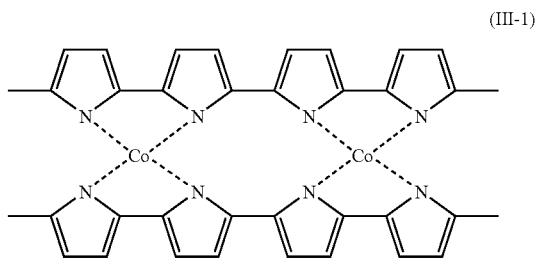
(III-1)

and a rhodium-pyrrole 1:4 coordination compound expressed by the following chemical formula (III-2).

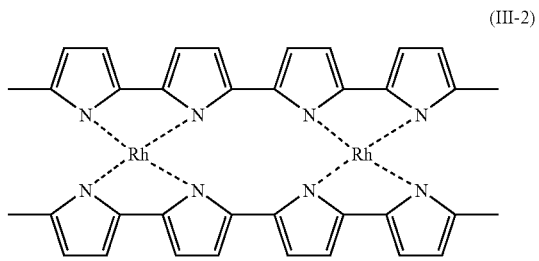
(III-2)

As shown in chemical formulae (I-1) and (I-2), (II-1) and (II-2), and (III-1) and (III-2), the coordination compounds used in the present invention take the form in which the hetero atoms of the heteromonocyclic compounds (nitrogen atoms when the compounds are pyrrole and aniline, sulfur atoms when the compound is thiophene) are coordinated to the catalyst metal atoms, and if any of the coordination compounds is electrochemically polymerized on a conductive material, the surface of the conductive material is coated with a catalyst metal-supporting polynuclear complex molecules.

The catalyst material in which the compounds of the above formulae (I-1) and (I-2) are made composite corresponds to the catalyst material of the present invention, characterized in that it is prepared by: coating the surface of a conductive material with a polynuclear complex molecule derived from at least two types of heteromonocyclic compounds; and coordinating a catalyst metal to the coating layer of the polynuclear complex molecule. The coordination compounds expressed by the above chemical formulae (II-1) and (II-2) and those of (III-1) and (III-2) correspond to catalyst materials of the present invention, characterized in that they are prepared by: coating the surface of a conductive material with a polynuclear complex molecule derived from a heteromonocyclic compound; and coordinating catalyst metals of a composite of a noble metal and a transition metal to the coating layer of the polynuclear complex molecule.

When the conductive material is a commonly used sheet-like or rod-like material, the electrochemical polymerization of any of the above coordination compounds on the conductive material can be carried out using conventional electrochemical polymerization apparatus under conventional conditions. However, when the conductive material used is a fine particle-like, fiber-like, hollow, or corned horn-like material, it is necessary to use fluidized bed electrode electrochemical polymerization apparatus, as described above. The electrochemical polymerization process using fluidized bed electrode electrochemical polymerization apparatus can be carried out in almost the same manner as described above, provided that any one of solvents capable of dissolving the above coordination compounds is used.

An example of a coordination compound obtained by coordinating a catalyst metal to the polymerization product of at least two types of heteromonocyclic compounds is a cobalt-polypyrrole 1:4 coordination compound expressed by the following chemical formula (IV-1):

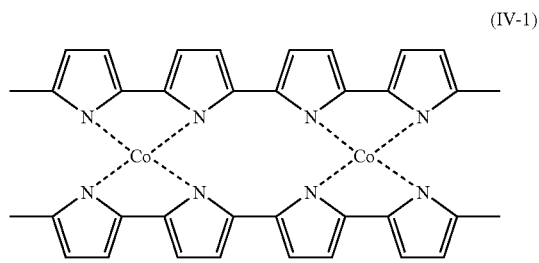

(IV-1)

or a cobalt-polyaniline 1:4 coordination compound expressed by the following chemical formula (IV-2).

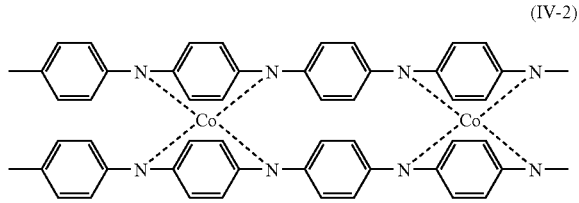

(IV-2)

An example of a coordination polymer compound in which a catalyst metal, which is a composite of a noble metal and a transition metal, is coordinated is a composite of a cobalt-polypyrrole 1:4 coordination compound expressed by the following formula (V-1):

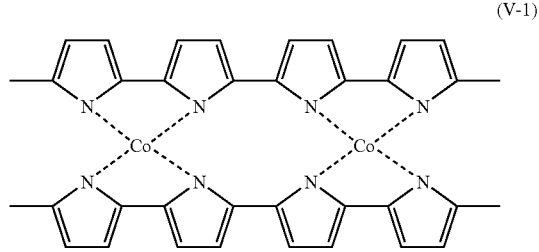

(V-1)

and an iridium-polypyrrole 1:4 coordination compound expressed by the following formula (V-2):

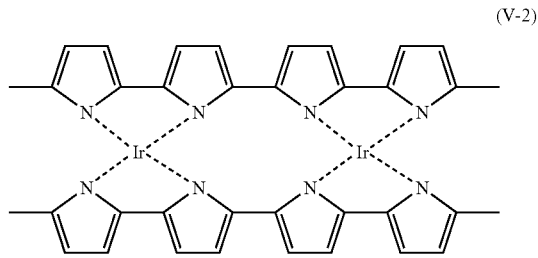

(V-2)

or a composite of a cobalt-polypyrrole 1:4 coordination compound expressed by the above formula (VI-1) and a rhodium-polypyrrole 1:4 coordination compound expressed by the following formula (V-3).

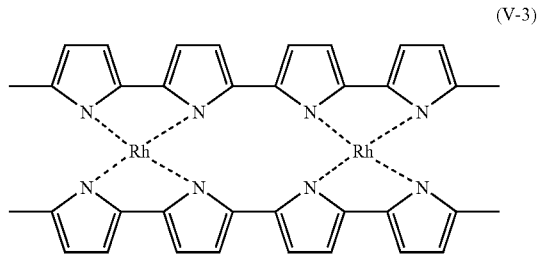

(V-3)

The coordination states expressed by the above chemical formulae (I-1) to (V-3) show the states in which 4 nitrogen atoms or sulfur atoms in heterocycles are ideally coordinated to a metal. In an actual polynuclear complex molecule derived from heteromonocyclic compounds, 4 nitrogen atoms or sulfur atoms in heterocycles are not always coordinated to one metal because of the assembly characteristics, bending state, or steric hindrance of its molecules. However, even in cases where only 3 or 2 nitrogen atoms or sulfur atoms are coordinated to a metal, if a low-molecular-weight heterocyclic compound is added to the reaction system, the low-molecular-weight heterocyclic compound added acts as an ancillary ligand and it becomes possible for the low-molecular-weight heterocyclic compound to be accessorily coordinated to the metal.

The coordination compound expressed by the following chemical formula (VI) shows the state in which one low-molecular-weight heterocyclic compound, pyridine, along with 3 pyrrole units in polypyrrole are coordinated to iridium, whereby 4 nitrogen atoms are completely coordinated to the iridium atom.

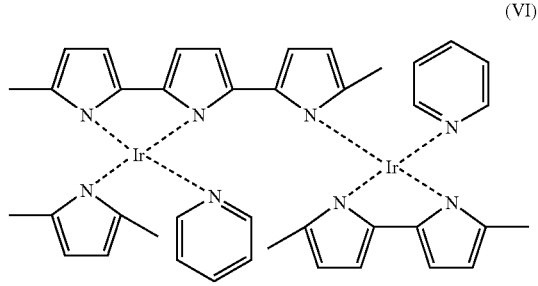

(VI)

The catalyst material of the present invention obtained as above coated with a polynuclear complex molecule having a catalyst metal coordinated thereto has superior catalytic activity to an electrode material having its surface modified with a macrocyclic compound such as porphyrin. And the catalyst material can be used as a catalyst which takes the place of platinum (Pt) or its alloys, for example, as an electrode catalyst for cathodes of various types of fuel cells.

An electrode catalyst material for the cathodes (oxygen or air electrode) of fuel cells is required to have catalytic action on the oxygen reduction reactions shown below, thereby accelerating such reactions. Specifically, when oxygen ($O_2$), proton ($H^+$) and electron ($e^-$) are supplied, the oxygen reduction reaction, such as 4-electron reduction of oxygen expressed by the following reaction formula (1) or the 2+2-electron reduction of oxygen expressed by the following reaction formulae (2) and (3), is accelerated through the catalysis of the catalyst material at an effective high potential.

<4-Electron Reduction of Oxygen>

(1)

<2+2-Electron Reduction of Oxygen>

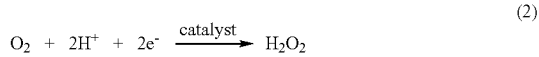

(2)

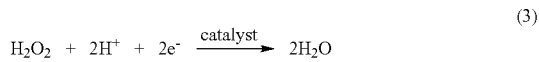

(3)

In the present invention, the number of the electrons involved in the reaction is 3.8 at maximal (close to 4) as a result of rotating disk electrode (RDE) measurement (the peak potential of oxygen reduction obtained by cyclic voltammetry (CV) is 0.27 V vs. SCE), as described later. This performance is comparable to the catalyst performance of platinum or its alloys which are currently used as an electrode catalyst material for the cathodes (oxygen or air electrodes) of fuel cells. This shows that the catalyst material of the present invention can be used as an electrode catalyst material for the cathodes (oxygen or air electrodes) of fuel cells.

The catalyst material of the present invention obtained in the above-described manner is preferably an anion-doped catalyst material. Examples of anions that can be used herein include Br, F, Cl, I, $ClO_4$, $SO_3$, $NO_3$, $PO_4$, $CH_3COO$, $CF_3COO$, $CF_3SO_3$, $BF_4$, and $PF_5$. Use of Br is particularly preferable. A method for doping an anion is not particularly limited. For example, the aforementioned catalyst material and KBr are added to a mixed solvent of water and methanol, and the resulting mixture is agitated with deaeration. Thus, the catalyst material can be doped with an anion.

Doping of the catalyst material of the present invention with an anion can further improve the oxidation reduction performance of the catalyst material. Thus, the anion-doped catalyst material has a sufficient catalytic performance required when it is used for fuel cells etc., and thus can be used in practice.

The catalyst material of the present invention, which is obtained as above, preferably contains a second metal and/or its ion as the other metal element. Examples of the second metal and/or the ion that can be used include: nickel, titanium, vanadium, chromium, manganese, iron, copper, zinc, zirconium, niobium, molybdenum, ruthenium, rhodium, palladium, silver, cadmium, tungsten, osmium, iridium, platinum, gold, and mercury. Of these metals and/or their ions, nickel (Ni) is particularly preferably used. The catalyst material containing a second metal and/or its ion can be prepared by adding a second metal and/or its ion when coordinating a catalyst metal, such as cobalt, to the coordination sites which are made up of polynuclear complex molecules. For example, the catalyst material containing a second metal and/or its ion of the present invention can be prepared by refluxing the conductive material coated with a heteromonocyclic compound, cobalt acetate and nickel acetate in a methanol solution.

If the catalyst material of the present invention contains a second metal and/or its ion, its oxidation reduction performance is much more improved. Thus, the catalyst material containing a second metal and/or its ion has a catalytic performance sufficient to meet the requirement imposed when it is used for fuel cells etc., and thus can be used in practice.

In preparation of a catalyst material of the present invention, it is preferable to heat treat the catalyst material obtained by coordinating a catalyst metal to coordination sites, which are formed by the polynuclear complex molecule derived from a heteromonocyclic compound. And it is more preferable to carry out the heat treatment in an atmosphere of an inert gas.

Specifically, a catalyst material including a polynuclear complex molecule is prepared by electrochemically polymerizing a heteromonocyclic compound to yield a polynuclear complex molecule so that a conductive material is coated with the polynuclear complex molecule and then allowing a catalyst metal to act on the coating layer so that the catalyst metal is coordinated to the coating layer, as described above. In this process, it is preferable to heat treat the catalytic material after coordinating the catalyst metal. When preparing a catalyst material by coating a conductive material surface with a catalyst-supporting polynuclear complex molecule derived from a coordination compound comprising a catalyst metal and a heteromonocyclic compound coordinated thereto, however, it is preferable to heat treat the catalytic material after coating the conductive material surface with the catalyst-supporting polynuclear complex molecules.

This heat treatment is carried out, for example, in such a manner that the temperature of the catalyst material is increased from the starting temperature (usually ordinary temperature) to a set temperature, kept at the set temperature for a certain period of time, and decreased little by little. The treatment temperature used in this heat treatment means the temperature at which the catalyst material is kept for a certain period of time. For example, the cell is evacuated to a desired pressure while being kept at the starting temperature, heated at a heating rate of 5° C./min to a set temperature T (T=about 400° C. to 700° C.), kept at the set temperature T for about 2 to 4 hours, and cooled to room temperature over about 2 hours.

As described above, heat treatment of the catalyst material results in further improvement of oxidation reduction performance of the catalyst material. Thus, the catalyst material having undergone heat treatment is allowed to have a catalytic performance sufficient to meet the requirement imposed when it is used for fuel cells etc., and thus can be used in practice.

EXAMPLES

Hereafter, the present invention will be described in more detail with reference to the following examples; however, it is to be understood that the invention is not limited to these examples.

Example 1

Polypyrrole/Polyaniline Composite System

The following 5 types of catalyst materials (a) to (e) were prepared.

a: Comparative Example 1-1

Electrochemical polymerization of pyrrole→introduction of Co (abbreviated as "Co-PPy-C")

b: Comparative Example 2-1

Electrochemical polymerization of aniline→introduction of Co (abbreviated as "Co-PAn-C")

c: Example 1-1

Simultaneous electrochemical polymerization of pyrrole and aniline→introduction of Co (abbreviated as "Co-PPy+PAn-C")

d: Example 1-2

Electrochemical polymerization of pyrrole→electrochemical polymerization of aniline→introduction of Co (abbreviated as "Co-PPy/PAn-C")

e: Example 1-3

Electrochemical polymerization of aniline→electrochemical polymerization of pyrrole→introduction of Co (abbreviated as "Co-PAn/PPy-C")

Hereafter, a synthesis example is demonstrated with reference to the case of "electrochemical polymerization of pyrrole and introduction of cobalt" of (a: Comparative Example 1-1). The same applies to other examples and comparative examples.

(1) In 200 ml of methanol containing 0.1 M ammonium perchlorate as a supporting electrolyte was dissolved 5.4 ml of pyrrole and 3 g of carbon particles (Ketjen, SGP, and Vulcan). After 30-minute argon deaeration, electrochemical polymerization was performed using a fluidized bed electrode for 45 minutes by constant potential method at an applied voltage of 1.8 V to yield polypyrrole-coated carbon particles.

The amount of pyrrole used was 10 times the amount calculated based on the assumption that pyrrole was attached to the surface area (800 $m^2/g$) of Ketjen Black carbon particles leaving no space among them. The amounts of pyrrole used concerning other polypyrrole-coated carbon particles were determined under the same conditions.

(2) On the polypyrrole-coated carbon particles obtained by the above (1), cobalt metal was supported in the following manner. Specifically, 2 g of polypyrrole-coated carbon particles and 4.1 g of cobalt acetate were put in a 200 ml eggplant-shaped flask, and methanol was added thereto. After 30-minute argon deaeration, the mixture was refluxed for 2 hours. The mixture was then subjected to suction filtration to filter off the solid content, and the solid content was vacuum dried at 120° C. for 3 hours to yield carbon particles coated with an electrochemically polymerized film having a pyrrole-cobalt complex (catalyst particles).

FIG. 1 is a flow diagram of the synthesis involving simultaneous electrochemical polymerization of pyrrole and aniline (c: Example 1-1) and introduction of cobalt.

The 5 types of catalyst materials (a) to (e) obtained in the above-described manners were heat-treated at 400° C.

Cyclic voltammetry (CV) and rotating disk electrode (RDE) measurements were made for the heat treated catalyst material to measure the peak potential and the number of the electrons involved in the reaction.

The measurements were made under the following conditions.

[CV (cyclic Voltammetry) and RDE]
(Rotating Disk Electrode) Measurement:
Measuring instruments:
Potentiostat [Nikkou Keisoku, DPGS-1]
Function generator [Nikkou Keisoku, NFG-5]
X-Y recorder [Rikendenshi, D-72DG]
Working electrode:
Edge plane pyrolytic graphite (EPG) electrode
Reference electrode:
Saturated Calomel electrode (SCE)
Counter electrode:
Platinum wire
Supporting electrolyte: 1.0 M $HClO_4$ aqueous solution
Sweeping range: 600 to −600 mV
Sweeping rate: 100 mV/sec (CV), 10 mV/sec (RDE)
Rotation rate: 100, 200, 400, 600, 900 rpm (RDE)
Measuring method:

In CV measurement for a complex alone, measurement was made using, as a working electrode, an electrode obtained by dissolving 20 mg of complex in 10 ml of methanol, casting 10 µl of the resultant complex solution over an edge plane pyrolytic graphite (EPG) electrode and further casting 8 µl of the mixed solution of Nafion and 2-propanol over the EPG electrode.

In 250 µl of Nafion solution, 20 mg of carbon-based particles having undergone each treatment was dispersed, and 20 µl of the dispersion was cast over an EPG electrode.

Table 1 shows the number of the electrons involved in the reaction of Example 1-1, Comparative Example 1-1, and Comparative Example 1-2 (as such number becomes closer to 4, the effects of $H_2O_2$ inhibition becomes greater) and the activity of oxygen reduction.

TABLE 1

| | | Number of electrons involved in reaction | Activity of oxygen reduction (mA/$cm^2$) |
|---|---|---|---|
| Example 1-1 | Co-PPy + PAn-C | 3.8 | 4.3 |
| Comparative Example 1-1 | Co-PPy-C | 2.0 | 1.0 |
| Comparative Example 1-2 | Co-PAn-C | 2.3 | 2.9 |

As is apparent from the results shown in Table 1, the catalyst material of the present invention comprising a conductive material coated with a polynuclear complex molecule derived from at least two types of heteromonocyclic compounds and a catalyst metal coordinated to the coating layer of the polynuclear complex molecule has the greater effects of $H_2O_2$ inhibition and superior capacity for oxygen reduction, compared with a catalyst material comprising a conductive material coated with a polynuclear complex molecule derived from a single type of heteromonocyclic compound and a catalyst metal coordinated to the coating layer of the polynuclear complex molecule.

Example 2

Polypyrrole System into which Co and Pd have been Introduced f: Example 2-1

Figure 3:
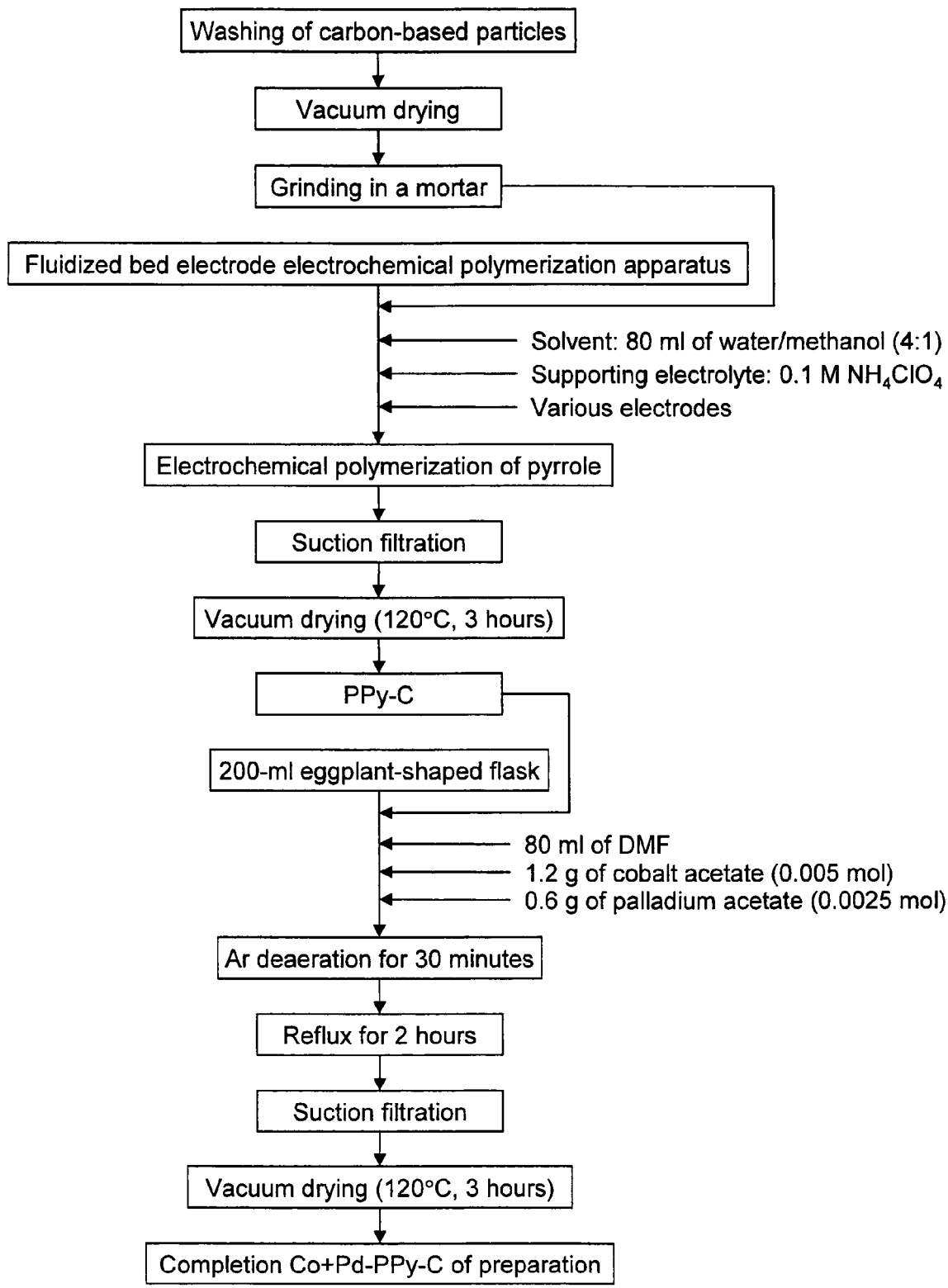
FIG. 3 is a flow diagram of the preparation involving introduction of a cobalt-palladium composite catalyst into polypyrrole (Co+Pd—PPy-C).

Mass synthesis involving electrochemical polymerization of pyrrole→introduction of Co and Pd (abbreviated as "Co+Pd-PPy-C") was performed in accordance with the flow diagram shown in FIG. 3. In accordance with the flow diagram shown in FIG. 3, the resultant "Co+Pd-PPy-C" was heat treated at a high temperature of 600° C. at ordinary pressure to obtain a heat-treated product (abbreviated as "HT600-Co+Pd-PPy-C").

The electric potentials at which oxygen reduction was initiated for the resultants "Co+Pd-PPy-C" and "HT600-Co+Pd-PPy-C" were inspected. As a result, such potential for "Co+Pd-PPy-C" was found to be 0.76 V, and that for "HT600-Co+Pd-PPy-C" was found to be 0.80 V. This indicates that heat treatment resulted in significant improvement in catalytic activity.

The measurements were made by MEA evaluation under the following conditions.

Humidification: temperature of anode humidifier: 75° C.; that of cathode humidifier: 60° C.
Back pressure: 1 atm
Gas flow: anode: $H_2$: 500 cc; cathode: $O_2$: 1,000 cc
Cell temperature: 80° C.
Electrochemical membrane: Nafion (112)

g: Example 2-2

In the above example, the Pd:Co ratio is 1:2 (the atomic ratio). In this example, the ratio of Pd as a noble metal was altered to prepare a catalyst material, and the peak current was inspected by RDE evaluation. The results are shown in FIG. 4.

Figure 4:
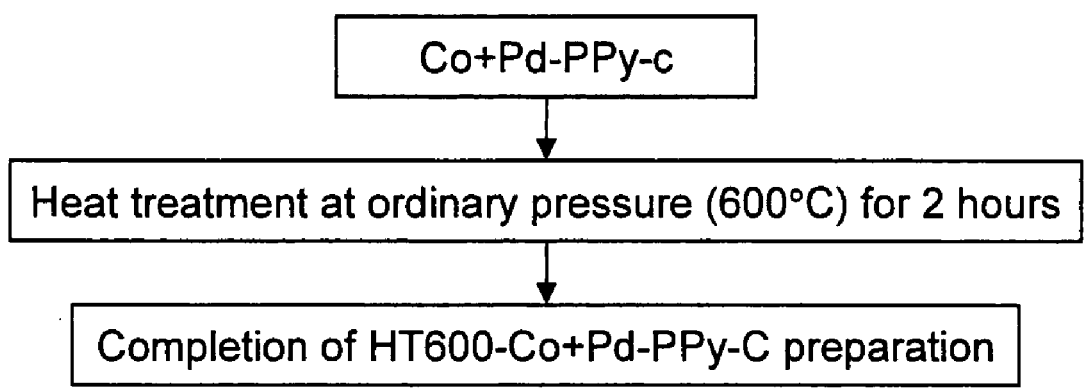
FIG. 4 is a flow diagram of the preparation of a product (HT600-Co+Pd—PPy-C) of heat treatment of "Co+Pd—PPy-C."
Figure 5:
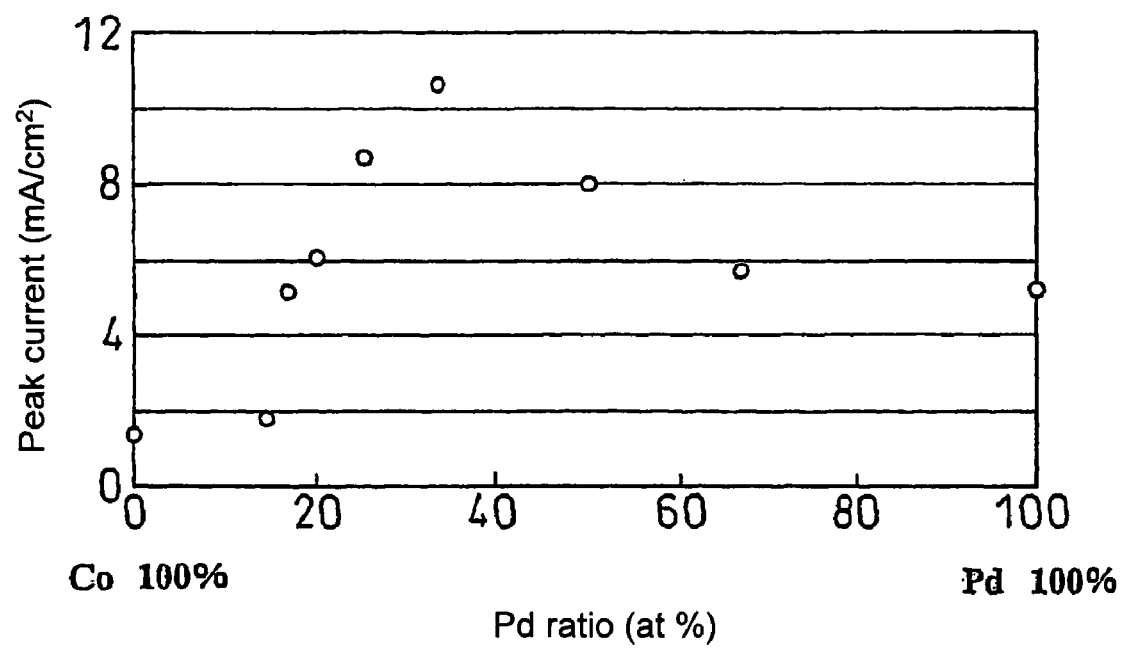
FIG. 5 is a chart showing the correlation of a Co—Pd ratio and performance attained via RDE evaluation.

As is apparent from the results shown in FIG. 4, the Pd ratio of 20% to 60% results in significant improvement in the peak current.

Example 3

Polypyrrole System into which Co and Ir have been Introduced h: Example 3-1

Polypyrrole was electrochemically polymerized on a carbon surface, and cobalt was introduced therein, followed by introduction of iridium to prepare a catalyst metal of a cobalt/iridium composite. Thereafter, the resultant is heat treated at 600° C. During the procedure shown in the flow diagram of the preparation of "Co+Pd-PPy-C" shown in FIG. 3, Ir was introduced in a xylene solution $[Ir(COD)Cl]_2$, following the introduction of Co. The ratio of Co:Ir introduction is 1:1 in terms of the atomic ratio. Thereafter, the resultant was heat treated at 600° C. at ordinary pressure for 1 hour to obtain "HT600-Co+Ir-PPy-C."

i: Comparative Example 3-1

The procedure of Example 3-1 was performed except that heat treatment was not carried out (abbreviated as "Co—Ir-PPy-C").

j: Comparative Example 3-2

The heat-treated product of "Co-PPy-C" was prepared (abbreviated as "HT600-Co+PPy-C").

Peak potentials, peak current densities, and the numbers of electrons involved in the reaction of Example 3-1, Comparative Example 3-1, and Comparative Example 3-2 were inspected. The results are shown in Table 2.

TABLE 2

|  |  | Peak potential (VvsSCE) (VvsNHE) | Peak current density (mA/cm²) | Numbers of electrons involved in reaction |
|---|---|---|---|---|
| Example 3-1 | HT600-Co + Ir-PPy-C | +0.50 [+0.74] | 4.03 | 3.6 |
| Comparative Example 3-1 | Co-Ir-PPy-C | +0.18 [+0.42] | 2.01 | — |
| Comparative Example 3-2 | HT600-Co-PPy-C | +0.38 [+0.62] | 1.50 | — |

As is apparent from the results shown in Table 2, when a catalyst of a cobalt/iridium composite is prepared and then heat treated at 600° C., both the oxygen reduction potential (peak potential) and the peak current density are improved, and a highly active catalyst can be obtained. This improved activity is considered to result from the Co—Ir interaction as observed in the Co—Pd system.

Example 4

Polypyrrole System into which Co and Rh have been Introduced k: Example 4-1

Polypyrrole was electrochemically polymerized on a carbon surface, cobalt and rhodium were simultaneously introduced therein to prepare a catalyst metal of a cobalt/rhodium composite, and the resultant was then heat treated at 300° C., 600° C., and 900° C. In accordance with the procedure shown in the flow diagram of the preparation of "Co+Pd-PPy-C" shown in FIG. 3, cobalt acetate and tetracarbonyl-di-μ-chloro-dirhodium (I) were introduced. The ratio of Co and Rh introduction was 1:1 in terms of the atomic ratio. Thereafter, the resultant was heat treated at 300° C. at ordinary pressure for 1 hour to obtain "HT300-Co+Rh-PPy-C." Separately, heat treatment was carried out at 600° C. at ordinary pressure for 1 hour to obtain "HT600-Co+Rh-PPy-C." Also, heat treatment was carried out at 900° C. at ordinary pressure for 1 hour to obtain "HT900-Co+Rh-PPy-C."

l: Comparative Example 4-1

The procedure of Example 4-1 was performed except that heat treatment was not carried out (abbreviated as "Co—Rh-PPy-C").

Peak potentials and peak current densities of Example 4-1 and Comparative Example 4-1 were inspected. The results are shown in Table 3.

TABLE 3

| Heat treatment temperature (° C.) | | Peak potential (VvsSCE) (VvsNHE) | Peak current density (mA/cm$^2$) |
|---|---|---|---|
| Room temperature | Co + Rh-PPy-C | +0.34 [+0.58] | 2.14 |
| 300 | HT300-Co + Rh-PPy-C | +0.40 [+0.64] | 4.14 |
| 600 | HT600-Co + Rh-PPy-C | +0.48 [+0.72] | 5.71 |

As is apparent from the results shown in Table 3, when a catalyst metal of a cobalt/rhodium composite is prepared and then heat treated, both the oxygen reduction potential (peak potential) and the peak current density are improved, and a highly active catalyst can be obtained. Heat treatment at 600° C. is particularly preferable. This improved activity is considered to result from the Co—Rh interaction as observed in the Co—Pd system.

Example 5

Highly Purified Catalyst System m: Example 5-1

Polypyrrole was electrochemically polymerized on a carbon surface, and cobalt and palladium were simultaneously introduced therein to prepare a catalyst comprising a catalyst metal of a cobalt/palladium composite. The purity of palladium acetate used as a palladium raw material was increased in the resulting catalyst. During the procedure shown in the flow diagram of the preparation of "Co+Pd-PPy-C" shown in FIG. 3, a reagent having palladium acetate purity of 97.0% was used. The ratio of Co and Pd introduction was 1:2 in terms of the atomic ratio.

n: Example 5-2 and o: Example 5-3

The procedure of Example 5-1 was performed except for the use of a reagent having palladium acetate purity of 99.8% to prepare catalysts twice.

Inspection of peak potentials and peak current densities, and XPS analysis of Example 5-1, Example 5-2, and Example 5-3 were performed. Catalyst materials were subjected to X-ray photoelectron spectroscopy (XPS). The results are shown in Table 4.

The conditions of X-ray photoelectron spectroscopy (XPS) were as follows.
Apparatus: Axis-Hi (Shimadzu Corporation)
X-ray source: MgKα (1253.6 eV)
Applied voltage: 12 kV
Anodic current: 10 mA
Pass energy: 40 eV

TABLE 4

| | Purity (%) | Peak potential (VvsSCE) (VvsNHE) | Peak current density (mA/cm$^2$) | XPS (atm %) | | |
|---|---|---|---|---|---|---|
| | | | | N | Co | Pd |
| Example 5-1 | 97.0 | +0.34 [+0.58] | 2.29 | 3.43 | 0.15 | 0.18 |
| Example 5-2 | 99.8 | +0.54 [+0.78] | 4.64 | 5.06 | 0.22 | 1.88 |
| Example 5-3 | 99.8 | +0.54 [+0.79] | 5.14 | 4.79 | 0.38 | 1.90 |

As is apparent from the results shown in Table 4, differences in purity of palladium acetate significantly affect catalytic activity. By increasing the purity of palladium acetate that is used as a palladium raw material, the oxygen reduction potential (peak current) and the peak current density are both enhanced, and a highly active catalyst can be obtained. The improvement may be attributed to the improvement in the surface composition of N, Co, Pd, etc., which form the active sites, particularly to the significant increase in the amount of Pd introduced.

Example 6

Addition of Ancillary Ligand p: Example 6

Figure 2:
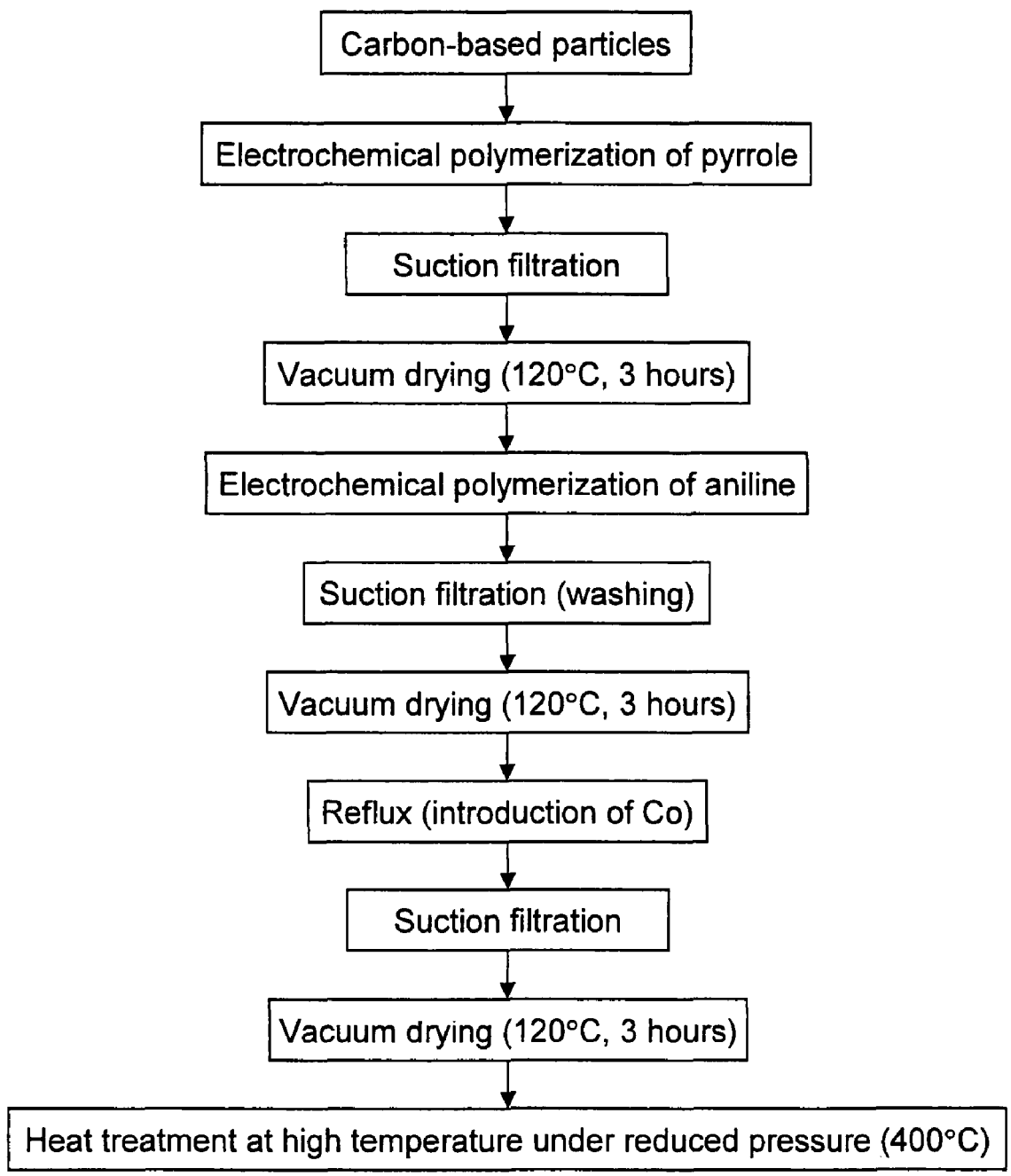
FIG. 2 is a flow diagram of the preparation involving electrochemical polymerization of pyrrole, followed by electrochemical polymerization of aniline, and introduction of cobalt (Co-PPy/PAn-C).

Polypyrrole was electrochemically polymerized on a carbon surface, and cobalt acetate and palladium acetate were introduced therein to prepare a catalyst comprising a catalyst metal of a cobalt/palladium composite. As the ancillary ligand at the time of noble metal introduction, pyrrole, 1-methyl imidazole, pyridine, and 1,10-phenanthroline were added in amounts of 4 times that of cobalt in terms of a molar ratio. During the procedure shown in the flow diagram of the preparation of "Co+Pd-PPy-C" shown in FIG. 2, 0.1 g of cobalt acetate and palladium acetate were introduced. The ratio of Co and Pd introduction was 1:1 in terms of the atomic ratio. Heat treatment was not performed.

q: Comparative Example 6

The procedure of Example 6 was performed except that no ancillary ligand was added.

Peak potentials and peak current densities of Example 6 and Comparative Example 6 were inspected. The results are shown in Table 5.

TABLE 5

| Ancillary ligand | Peak potential (VvsSCE) (VvsNHE) | Peak current density (mA/cm$^2$) |
|---|---|---|
| None | +0.51 [+0.75] | 2.50 |
| Pyrrole | +0.46 [+0.70] | 1.68 |
| 1-Methyl imidazole | +0.51 [+0.75] | 2.29 |
| Pyridine | +0.52 [+0.76] | 4.32 |
| 1,10-Phenanthroline | +0.53 [+0.77] | 3.82 |

As is apparent from the results shown in Table 5, use of an ancillary ligand at the time of noble metal introduction can enhance the oxygen reduction potential (peak potential) and the peak current density, and a highly active catalyst can be obtained. 1,10-Phenanthroline is particularly preferable as an ancillary ligand. This improved activity is considered to result from the reaction of the ancillary ligand with a site at which coordination is insufficient. Specifically, 2 nitrogen atoms of 1,10-phenanthroline are coordinated to cobalt and palladium as ancillary ligands together with polypyrolle.

INDUSTRIAL APPLICABILITY

The catalyst material of the present invention comprises a catalyst metal supported on a polynuclear complex molecule. Such catalyst material has excellent catalytic activity and can improve an effect of restraining the production of hydrogen peroxide when used as a catalyst for fuel cells. Thus, the present invention contributes to widespread use of fuel cells.

The invention claimed is:

1. A catalyst solid material comprising a conductive material coated with a polynuclear complex molecule derived from at least two types of heteromonocyclic compounds, the at least two types of heteromonocyclic compounds being selected from the group consisting of pyrrole, dimethylpyrrole, pyrrole-2-carboxyaldehyde, pyrrole-2-alcohol, aniline, aminobenzoic acid, and thiophene, and a catalyst metal coordinated to the coating layer of the polynuclear complex molecule, wherein the catalyst metal is a composite of a noble metal and a transition metal, and the content of the noble metal in the catalyst material comprising composite catalyst metals is 20 to 60 wt %.

2. A catalyst solid material comprising a conductive material coated with a polynuclear complex molecule derived from a heteromonocyclic compound, the polynuclear complex consisting of electrochemically polymerized heteromonocyclic compounds possessing a basic skeleton selected from the group consisting of pyrrole, dimethylpyrrole, pyrrole-2-carboxaldehyde, pyrrole-2-alcohol, aminobenzoic acid, aniline, and thiophene, and a catalyst metal, which is a composite of a noble metal and a transition metal, coordinated to the coating layer of the polynuclear complex molecule, wherein the content of the noble metal in the catalyst material comprising composite catalyst metals is 20 to 60 wt %.

3. The catalyst solid material according to claim 1, wherein the polynuclear complex molecule derived from the at least two types of heteromonocyclic compounds is obtained by subjecting the at least two types of heteromonocyclic compounds to electrochemical polymerization.

4. The catalyst solid material according to claim 1, wherein the noble metal is one or more members selected from the group consisting of palladium (Pd), iridium (Ir), rhodium (Rh), and platinum (Pt); and the transition metal is one or more members selected from the group consisting of cobalt (Co), iron (Fe), molybdenum (Mo), and chromium (Cr).

5. The catalyst solid material according to claim 1, wherein the noble metal is iridium (Ir) and the transition metal is cobalt (Co).

6. The catalyst solid material according to claim 1, wherein the noble metal is rhodium (Rh) and the transition metal is cobalt (Co).

7. The catalyst solid material according to claim 1, wherein the noble metal is palladium (Pd) and the transition metal is cobalt (Co).

8. The catalyst solid material according to claim 1, wherein a low-molecular-weight heterocyclic compound is coordinated to the catalyst metal as an ancillary ligand.

9. The catalyst solid material according to claim 8, wherein the low-molecular-weight heterocyclic compound is pyridine and/or phenanthroline.

10. The catalyst solid material according to claim 1, wherein the catalyst material comprising composite catalyst metals is further heat-treated.

11. The catalyst solid material according to claim 1, wherein raw material for the catalyst material comprising composite catalyst metals is highly purified.

12. The catalyst solid material according to claim 1, wherein the conductive material is selected from among metal, semiconductor, carbon-based compound, and conductive polymer.

13. The catalyst solid material according to claim 1, which further includes a second metal and/or its ion.

14. The catalyst solid material according to claim 1, which is doped with an anion.

15. A method for preparing a catalyst solid material comprising a step of coating a conductive material surface with a polynuclear complex molecule derived from at least two types of heteromonocyclic compounds, the at least two types of heteromonocyclic compounds being selected from the group consisting of pyrrole, dimethylpyrrole, pyrrole-2-carboxyaldehyde, pyrrole-2-alcohol, aniline, aminobenzoic acid, and thiophene, and a step of coordinating a catalyst metal to the coating layer of the polynuclear complex molecule, wherein the catalyst metal is a composite of a noble metal and a transition metal, and the content of the noble metal in the catalyst material comprising composite catalyst metals is 20 to 60 wt %.

16. A method for preparing a catalyst solid material comprising a step of coordinating a catalyst metal to at least two types of heteromonocyclic compounds, the at least two types of heteromonocyclic compounds being selected from the group consisting of pyrrole, dimethylpyrrole, pyrrole-2-carboxyaldehyde, pyrrole-2-alcohol, aniline, aminobenzoic acid, and thiophene, and a step of coating a conductive material surface with a polynuclear complex molecule derived from the at least two types of heteromonocyclic compounds, wherein the catalyst metal is a composite of a noble metal and a transition metal, and the content of the noble metal in the catalyst material comprising composite catalyst metals is 20 to 60 wt %.

17. A method for preparing a catalyst solid material comprising a step of coating a conductive material surface with a polynuclear complex molecule derived from a heteromonocyclic compound, the polynuclear complex consisting of electrochemically polymerized heteromonocyclic compounds possessing a basic skeleton selected from the group consisting of pyrrole, dimethylpyrrole, pyrrole-2-carboxyaldehyde, pyrrole-2-alcohol, aminobenzoic acid, aniline, and thiophene, and a step of coordinating a catalyst metal, which is a composite of a noble metal and a transition metal, to the coating layer of the polynuclear complex molecule, wherein the content of the noble metal in the catalyst material comprising composite catalyst metals is 20 to 60 wt %.

18. A method for preparing a catalyst solid material comprising a step of coordinating a catalyst metal, which is a composite of a noble metal and a transition metal, to a heteromonocyclic compound and a step of coating a conductive material surface with a polynuclear complex molecule derived from the heteromonocyclic compound, wherein the content of the noble metal in the catalyst material comprising composite catalyst metals is 20 to 60 wt %, and the polynuclear complex consists of electrochemically polymerized heteromonocyclic compounds possessing a basic skeleton selected from the group consisting of pyrrole, dimethylpyrrole, pyrrole-2-carboxyaldehyde, pyrrole-2-alcohol, aminobenzoic acid, aniline, and thiophene.

19. The method for preparing a catalyst solid material according to claim 15, wherein the step of coating the conductive material surface with a polynuclear complex molecule derived from the at least two types of heteromonocyclic compounds comprises electrochemical polymerization of the at least two types of heteromonocyclic compounds on the conductive material, and the subsequent step of coordinating a catalyst metal to the coating layer of the polynuclear complex molecule comprises allowing a catalyst metal or a salt thereof to react with the coating layer of the polynuclear complex molecule.

20. The method for preparing a catalyst solid material according to claim 15, wherein the step of coating the conductive material surface with a polynuclear complex molecule derived from the at least two types of heteromonocyclic compound involves electrochemical polymerization of the coordination compound on the conductive material, and the subsequent step of coordinating a catalyst metal to the coating layer of the polynuclear complex molecule involves coordinating a catalyst metal to a heteromonocyclic compound from which the polynuclear complex was derived.

21. The method for preparing a catalyst solid material according to claim 15, wherein a step of heat treatment is carried out following the step of coordinating a catalyst metal.

22. The method for preparing a catalyst solid material according to claim 15, wherein the polynuclear complex molecule derived from the at least two types of heteromonocyclic compounds is obtained by subjecting the at least two types of heteromonocyclic compounds to electrochemical polymerization.

23. The method for preparing a catalyst solid material according to claim 15, wherein the noble metal is at least one member selected from among palladium (Pd), iridium (Ir), rhodium (Rh), and platinum (Pt), and the transition metal is at least one member selected from among cobalt (Co), iron (Fe), molybdenum (Mo), and chromium (Cr).

24. The method for preparing a catalyst solid material according to claim 15, wherein the noble metal is iridium (Ir) and the transition metal is cobalt (Co).

25. The method for preparing a catalyst solid material according to claim 15, wherein the noble metal is rhodium (Rh) and the transition metal is cobalt (Co).

26. The method for preparing a catalyst solid material according to claim 15, wherein the noble metal is palladium (Pd) and the transition metal is cobalt (Co).

27. The method for preparing a catalyst solid material according to claim 15, which comprises a step of coordinating a low-molecular-weight heterocyclic compound to the catalyst metal as an ancillary ligand.

28. The method for preparing a catalyst solid material according to claim 27, wherein the low-molecular-weight heterocyclic compound is pyridine and/or phenanthroline.

29. The method for preparing a catalyst solid material according to claim 15, which comprises a step of purifying a raw material for the catalyst material comprising composite catalyst metals.

30. The method for preparing a catalyst solid material according to claim 15, wherein the conductive material is selected from among metal, semiconductor, carbon-based compound, and conductive polymer.

31. The method for preparing a catalyst solid material according to claim 15, which further includes a second metal and/or its ion.

32. The method for preparing a catalyst solid material according to claim 15, which is doped with an anion.

33. A fuel cell which includes the catalyst solid material according to claim 1 as a catalyst for fuel cells.

* * * * *